US006265074B1

United States Patent
Shah et al.

(10) Patent No.: US 6,265,074 B1
(45) Date of Patent: Jul. 24, 2001

(54) WRITE-ERASE BOARD

(75) Inventors: Jayesh C. Shah, Odenton, MD (US); Lance R. Altizer, Spotswood; Insuk Chung, North Bergen, both of NJ (US); David J. Gibboni, Haverton, PA (US)

(73) Assignee: Honeywell International Inc., Morris Township, NJ (US)

( * ) Notice: Subject to any disclaimer, the term of this patent is extended or adjusted under 35 U.S.C. 154(b) by 0 days.

(21) Appl. No.: 09/512,758

(22) Filed: Feb. 25, 2000

(51) Int. Cl.$^7$ ........................................ B32B 27/38
(52) U.S. Cl. ..................... 428/413; 428/354; 156/278
(58) Field of Search ................ 156/60, 278; 428/413, 428/213, 215, 332, 500, 501, 502, 507, 514, 537.1, 537.5, 343, 353, 480, 479.4, 423.1

(56) References Cited

U.S. PATENT DOCUMENTS

| | | | |
|---|---|---|---|
| 5,024,898 | 6/1991 | Pitts et al. | 428/511 |
| 5,037,702 | 8/1991 | Pitts et al. | 428/423.7 |
| 5,361,164 | * 11/1994 | Steliga | 359/455 |
| 5,422,155 | 6/1995 | Spence, Jr. | 428/76 |

* cited by examiner

Primary Examiner—Blaine Copenheaver
Assistant Examiner—Christopher Paulraj
(74) Attorney, Agent, or Firm—Roger H. Criss

(57) ABSTRACT

A write-erase article formed of a substrate coated on one surface with a cured epoxy coating composition, and coated on another surface with an adhesive. The epoxy-coated surface is markable with dry wipe inks without causing permanent discernible distortion of the substrate. The epoxy-coated surface after marking is substantially fully erasable. The article may be adhered via the adhesive to a support.

39 Claims, No Drawings

WRITE-ERASE BOARD

BACKGROUND OF THE INVENTION

1. Field of the Invention

The present invention relates to dry erasable boards. More particularly, the invention relates to coatings for erasable, markable surfaces for use with erasable marking pens.

2. Description of the Related Art

In the past, traditional classroom education relied entirely upon a "blackboard" and chalk as the medium for demonstrational instruction. This technique has proven to be relatively messy due to the chalk dust and smaller pieces of broken chalk. Blackboards were also limited in the range of chalk colors they could accept, due to their relatively dark color and the difficulty in completely erasing chalk colors other than white. One solution to this problem is the use of overhead projectors or laptop computers, but these units which provide graphics capability are relatively slow and costly for casual use.

A more economical solution to this problem is the use of dry erasable marking systems, or "dry erase boards", which use erasable marking pens to provide the utility of a blackboard or chalkboard, while eliminating the mess of chalk dust and the difficulty of cleanup of multiple colors. Dry erase boards typically have a smooth, markable, coated writing surface formed by coating a substrate with a lacquer coating which is subsequently cured. Dry erase marking pens are typically felt tip marking instruments containing specially formulated inks which satisfactorily mark these coated writing surfaces, and can be substantially fully erased from these surfaces after the ink has dried. These dry-erase markers leave substantially no mess, and erasure typically requires only minimal manual effort using a conventional dry eraser, cloth, or paper tissue.

Previously developed dry-erase boards include writing surfaces made of coated paper or film, melamine, or ceramic which are adhered to smooth, hard, rigid substrates such as paper board, fiber board, plastic, wood, and the like. Coated paper and film based dry-erase surfaces are relatively inexpensive, however they suffer from a number of disadvantages. The erasable, markable character of these surfaces deteriorates gradually with repeated application and erasure of dry erasable inks. The chemical materials used to mark these surfaces often cause deformation of these surfaces, resulting in the formation of non-removable ghost images after continued use. These surfaces are also known to exhibit poor solvent resistance, and are often incompatible with certain dry erase markers. Ceramic based dry erase surfaces provide good erasability but are relatively expensive.

It would therefore be desirable to produce an inexpensive writable-erasable article which provides good erasability after continued use. The article of the present invention provides a solution to this problem. According to the invention, a substrate is coated with a specially formulated epoxy coating on one side, and an adhesive on another side. Surprisingly, the epoxy coating of the invention provides excellent erasability with substantially no ghosting images. It also exhibits good solvent resistance and is compatible with substantially all dry erase markers. The articles formed according to the invention may then be adhered to a support via an adhesive, and sold inexpensively to consumers in the form of a writable-erasable or "dry-erase" boards in a variety of sizes, depending on specific need.

SUMMARY OF THE INVENTION

The invention provides a write-erasable article which comprises a substrate having front and rear surfaces, a substantially non-tacky, non-porous, cured epoxy coating composition on the front surface of the substrate and an adhesive coating on the rear surface of the substrate.

The invention also provides a writable-erasable board which comprises a substrate having front and rear surfaces, a substantially non-tacky, non-porous, cured epoxy coating composition on the front surface of the substrate and an adhesive coating on the rear surface of the substrate.

The invention further provides a method of producing a writable-erasable board which comprises forming a substantially non-tacky, non-porous, cured epoxy coating composition on the front surface of a substrate; forming an adhesive coating on the rear surface of the substrate; and then attaching a support to the rear surface of the substrate via the adhesive coating.

DETAILED DESCRIPTION OF THE PREFERRED EMBODIMENT

The article of the present invention comprises a substrate coated with a cured epoxy coating composition on one surface and an adhesive coating on an opposite surface. This article may be used as a "dry erase board".

The writable-erasable boards of the present invention may be produced by forming a substantially non-tacky, non-porous, cured epoxy coating composition on the front surface of a substrate, forming an adhesive coating on the rear surface of the substrate, and then attaching a support to the rear surface of the substrate via the adhesive coating.

The cured epoxy coating composition of the present invention is preferably substantially non-tacky and non-porous. This is to provide a surface which is easy to write on, while providing good erasability. The coating preferably comprises the reaction product of at least one epoxy polymer or epoxy precursor, at least one amine crosslinker, and at least one acid catalyst.

Optionally, but preferably, the epoxy coating composition contains an adhesion promoter and a solvent which is compatible with the other coating composition components.

The epoxy polymer or precursor of the present invention is one which has an epoxide equivalent weight of at least about 500 and preferably from about 500 to about 3,800.

Suitable epoxy polymers (or epoxy precursors) nonexclusively include

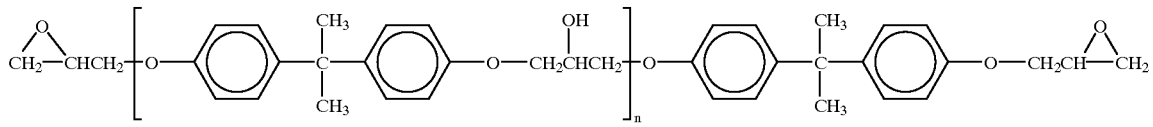

wherein n is at least 2 in order to have good solvent resistance. Preferred epoxy polymers include Dow DER 661 (equivalent epoxide weight of 525), Dow DER 662 (equivalent epoxide weight of 650), Dow DER 664 U (equivalent epoxide weight of 900), Dow DER 667 (equivalent epoxide weight of about 2000), Dow DER 668 and 669 (equivalent epoxide weight of 2300 to 3800), available commercially from Dow Chemical Company, and EPON 1001F (equivalent epoxide weight of 525), EPON 1002F, EPON 1004F, EPON 1007F and EPON 1009F, available commercially from Shell are also useful. The weight percentage of the uncured epoxy polymer in the epoxy coating ranges from at about 30% to about 70%, preferably from about 45% to about 65%, more preferably from about 50% to about 60% based on the weight of the epoxy coating composition solids.

The amine crosslinker of the current invention has the characteristics that it can be combined with the epoxy polymer or precursor, to form a cured, crosslinked epoxy coating. Such a crosslinker will typically be a chemical compound bearing at least three functional groups, preferably the same group, which will react with the epoxy polymer or precursor in the presence of an acid catalyst to generate a covalent bond. Preferred amine crosslinkers include melamine formaldehydes and aziridines. Suitable crosslinkers include trimethylolpropane tris[3-(2-methylaziridinyl)propanoate, which is sold under the trade names Ionac PFAZ 322 available commercially from Cybron Chemical, Inc. of Birmingham, N.J. and NeoCryl CX-100 available commercially from Zeneca Resins of Wilmington, Mass. Another effective crosslinker is the polymer generated by reaction of 1,3,5-triazine-2,4,6-triamine with formaldehyde, sold commercially as Cymel 350 or Cymel 385 available commercially from Cytec of West Paterson, N.J. The most preferred amine crosslinker is Resimene 797, a melamine crosslinker which is commercially available from Solutia. A useful preferred aziridine crosslinker is Hydroflex XR-2990 which is commercially available from H.B. Fuller Company of St. Paul, Minn. The weight percentage of the crosslinker in the uncured epoxy coating ranges from at about 20% to about 60%, preferably from about 30% to about 45%, more preferably from about 35% to about 40% based on the weight of the epoxy coating composition solids.

The acid catalyst of the present invention serves to catalyze the crosslinking of the epoxy polymer or precursor with the crosslinker. Suitable acid catalysts nonexclusively include strong organic acids and strong mineral acids, i.e. those having a pH of about 2 or less. Suitable mineral acids nonexclusively include sulfuric acid, hydrochloric acid and phosphoric acid. Suitable organic acids nonexclusively include sulfonic acids and phosphonic acids. Nonexclusive examples of suitable organic acids include p-toluene sulfonic acid, p-bromobenzene sulfonic acid, p-nitrobenzene sulfonic acid, methane sulfonic acid, trifluoromethyl sulfonic acid and related organic acids. The most preferred acid catalyst is Nacure 155, available commercially from King Industries. The weight percentage of the acid catalyst in the uncured epoxy coating ranges from at about 6% to about 10%, preferably from about 6.5% to about 9%, more preferably from about 7% to about 8% based on the weight of the epoxy coating.

The epoxy coating may contain additional ingredients such as fillers, surfactants, adhesion promoters, lubricants, matting agents, colorants, slip additives, nucleating agents, plasticizers, reinforcing agents, antiblocking agents, oxidation stabilizers, oxidation inhibitors, thermal stabilizers and ultraviolet light stabilizers. Preferably, such may be present in an amount of about 10% or less based on the weight of the epoxy composition. The most preferred adhesion promoter is Silane A-187, available commercially from Witco. The most preferred lubricant is Silicone BYK 370, available commercially from BYK Chemie. The most preferred matting agent is dry Syloid S378, available commercially from Grace Davison.

Non-exclusive examples of suitable fillers, which can also serve as matting agents, include a wide variety of minerals, metals, metal oxides, siliceous materials, metal salts, and mixtures thereof. These fillers may optionally be treated with various coupling agents or adhesion promoters, as is known to those skilled in the art. Examples of fillers included in these categories are silica, titanium dioxide, alumina, aluminum hydrates, feldspar, asbestos, talc, calcium carbonates, clay, carbon black, quartz, novaculite and other forms of silica such as kaolinite, bentonite, garnet, mica, saponite, beidelite, calcium oxide, calcium hydroxide, etc. The most preferred filler silica is silicon dioxide. The preferred particle size of the filler ranges from about 2 microns to about 10 microns.

Suitable surfactants nonexclusively include anionic, cationic, nonionic, amphoteric and zwitterionic surfactants which are compatible with the other epoxy coating ingredients. Nonexclusive examples of such anionic surfactants include sulfated or sulfonated synthetic organic detergents. The useful sulf(on)ated detergents include the linear higher alkylbenzene sulfonates, olefin sulfonates and paraffin sulfonates, and higher fatty alcohol sulfates, higher fatty alcohol polyethoxylate sulfates (of 3 to 30 ethoxy groups, preferably 3 to 15), monoglyceride sulfates, and other commercially available sulf(on)ates of satisfactory surface activity and compatibility. Such products will normally contain a lipophilic moiety which includes a higher aliphatic group, of which groups the most preferred is higher linear alkyl. Such alkyl will normally be of 8 to 20 carbon atoms, preferably being of 10 to 18 carbon atoms, e.g., lauryl, myristyl, and cetyl.

Nonionic synthetic organic detergents optionally employed in the practice of the invention may be any of a wide variety of such compounds which are well known in the art. Suitable nonionic surfactants are poly-lower alkoxylated lipophiles wherein the desired hydrophile-lipophile balance is obtained from addition of a hydrophilic poly-lower alkoxy group to a lipophilic moiety. A preferred class of the nonionic detergent employed is the poly-lower alkoxylated higher alkanol wherein the alkanol is of 10 to 18 carbon atoms and wherein the number of mols of lower alkylene oxide (of 2 or 3 carbon atoms) is from 3 to 12.

Other anionic, cationic, nonionic, amphoteric and zwitterionic surfactants are described at length in the text Surface Active Agents, Vol. II, by Schwartz, Perry and Berch, published in 1958 by Interscience Publishers and in McCutcheon's Detergents and Emulsifiers, 1969 Annual. Suitable surfactants are commercially available as propylene glycol (Sigma), Triton GR5M (Union Carbide), Additive #14 (Dow Corning), Surfynol 104 (Air Products), and the Fluorad series of surfactants (3M).

The epoxy coating can be formed in any conventional manner such as by blending the epoxy polymer or precursor with sufficient water or other suitable solvent to form a dispersion, adding at least one amine crosslinker, at least one acid catalyst and the optional ingredients to a vessel with vigorous stirring. Suitable solvents non-exclusively include alcohols, ketones, ethers, esters, hydrocarbons and mixtures thereof. Preferred solvents include n-propanol, toluene and methyl ethyl ketone. The components are preferably combined and stirred in a closed vessel for a time sufficient to permit crosslinking to occur. Optionally, all of the components except the acid catalyst may be pre-mixed and stored for later use. The acid catalyst may be added later to begin the crosslinking process, which leads to the ultimate formation of the epoxy coating.

Once formed, the epoxy coating is preferably applied to a substrate having front and rear surfaces. The substrate is preferably flexible, but may be rigid. Suitable substrate materials nonexclusively include a flexible or rigid polymeric film or sheet having one or more layers of homopolymers and copolymers of polyesters, polyolefins, polycarbonates, polyurethanes, halopolymers, acrylics, styrene containing polymers, polyamides, vinyl polymers and combinations thereof. Preferred polymeric films include polyethylene, poly(chlorotrifluoro ethylene) homopolymers and copolymers, ethylene chlorotrifluoroethylene copolymer, ethylene tetrafluoroethylene copolymer, fluorinated ethylene-propylene copolymers, perfluoroalkoxy polymer, poly(vinylidene fluoride), poly(vinyl fluoride), poly(vinylidene chloride), poly(vinyl chloride), homopolymers and copolymers of tetrafluoroethylene, homopolymers and copolymers of hexafluoropropylene, homopolymers and copolymers of vinylidene fluoride and combinations thereof. Preferred substrates include fluoropolymer films available under the trademark ACLAR® from Honeywell International Inc. of Morristown, N.J. and polyester films. The thickness of the substrate preferably ranges from about 5 μm to about 100μm, more preferably from about 5 μm to about 20 μm, most preferably from about 7 μm to about 15 μm, however thinner or thicker substrates may optionally be used.

The epoxy coating is applied to the front surface of the substrate. The coating may be applied by any of several methods known to those skilled in the art. It is important that this coating is sufficiently smooth such that after curing no gaps, scratches or other optical defects are present. For example, the epoxy coating may be applied to the substrate by knife coating, coating with a Meyer rod, gravure coating, forward and reverse roll coating, die coating, spraying, doctoring, brushing, dipping, meniscus coating or air knife techniques which are well known in the art. The optimum coating weight ranges from about 0.75 g/m$^2$ to about 2.5 g/m$^2$. The optimum coating thickness ranges from about 0.7 microns to about 2.3 microns.

The epoxy coating is then preferably cured by any conventional curing method, such as drying or heating. According to the present invention, the coating is preferably dried to remove the water and solvents, and allow the crosslinking reaction to occur. Typically, in a commercial operation, the coating operation will operate continuously on a sheet of film passing through the coater, and this coated film will then pass into an oven. Any type of oven, convection or infrared, for example, could be used to dry the coating. The oven temperature required to dry the coating will depend on the amount of liquid to be removed, as well as the size of the oven and the line speed with which the film passes through the oven; shorter times require higher temperatures. In the preferred embodiment, the temperature ranges from about 148.9° C. (300° F.) to about 176.7° C. (350° F.), more preferably, the temperature ranges from about 160° C. (320° F.) to about 165.6° C. (330° F.). The dwell time at such temperature preferably ranges from about 10 seconds to about 30 seconds, more preferably from about 15 seconds to about 20 seconds.

In the practice of the present invention, an adhesive composition is applied to the rear surface of the substrate to form the article of the present invention. The adhesive composition may comprise any adhesive known to those skilled in the art. The adhesive composition preferably comprises a heat activatable adhesive or a pressure sensitive adhesive. The adhesive composition may be formed by blending with a solvent. Suitable solvents nonexclusively include those named above. Preferred solvents include ethanol and toluene. Preferred adhesives include Adcote 35K2 and Adcote 2730-2B, available commercially from Rohm & Haas and Alcoa S11, available commercially from Alcoa.

Suitable adhesives nonexclusively include modified polyolefin compositions composed of a polyolefin having at least one functional moiety of unsaturated polycarboxylic acids and anhydrides thereof. The polyolefins used may include polymers of alpha-olefin monomers having from about 2 to about 6 carbon atoms and includes homopolymers, copolymers (including graft copolymers), and terpolymers of alpha-olefins. Illustrative homopolymer examples include ultra low density (ULDPE), low density (LDPE), linear low density (LLDPE), medium density (MDPE), or high density polyethylene (HDPE); polypropylene; polybutylene; polybutene-1; poly-3-methylbutene-1; poly-pentene-1; poly-4-methylpentene-1; polyisobutylene; and polyhexene. Unsaturated carboxylic acid and anhydrides include maleic acid and anhydride, fumaric acid and anhydride, crotonic acid and anhydride, citraconic acid and anhydride, itaconic acid and anhydride and the like. Of these, the most preferred is maleic anhydride. The modified polyolefins suitable for use in this invention include compositions described in U.S. Pat. Nos. 3,481,910; 3,480,580; 4,612,155 and 4,751,270. A useful adhesive is a maleic anhydride modified ethylene α-olefin copolymer which is also known as linear ultra low density polyethylene. The preferred modified polyolefin composition comprises from about 0.001 and about 10 weight percent of the functional moiety, based on the total weight of the modified polyolefin. More preferably the functional moiety comprises from about 0.005 and about 5 weight percent, and most preferably from about 0.01 and about 2 weight percent. The modified polyolefin composition may also contain up to about 40 weight percent of thermoplastic elastomers and alkyl esters as described in U.S. Pat. No. 5,139,878. A useful adhesive is Flexomer 1373 from Union Carbide which is a 10% maleic anhydride modified copolymer of ethylene and butene.

The adhesive is typically applied hot, after melting, and then allowed to cool. The adhesive may be applied by any of the above methods.

The epoxy coated article is then preferably adhered or laminated to a suitable support to make it more durable for consumer use. Preferably, the rear adhesive coated surface of the article is adhered to the suitable support via the adhesive layer. In a preferred embodiment, the article is adhered to a plastic substrate in-line during the extrusion process. Suitable supports nonexclusively include polymer films and sheets, such as high impact polystyrene, cardboard, paperboard, foamboard, wood, glass, metals (including magnetic materials), paper, and masonry board. The support is preferably a substantially rigid board, but may be flexible or bendable. The thickness of the support preferably ranges from about 25 μm to about 500 mm., more preferably from about 100 μm to about 50 mm, most preferably from about 350 μm to about 3.5 mm., however thinner or thicker supports may optionally be used.

One method of attachment is by lamination. Typically, laminating is done by bringing the adhesive coated side of the substrate into contact with the support under conditions of sufficient heat and pressure to cause the substrate to adhere to the support. Typically the epoxy coated substrate is positioned with the adhesive side against the support and the combination is passed through the nip of a pair of heated laminating rollers by techniques well known in the art. Lamination heating may be done at temperatures ranging from about 75° C. to about 175° C., at pressures ranging from about 5 psig (0.034 MPa) to about 100 psig (0.69 MPa) for from about less than one second to about 5 minutes, preferably from about one second to about 1 minute.

The following non-limiting examples serve to illustrate the invention.

EXAMPLE 1

An epoxy coating composition is prepared by first forming a mixture containing 24 weight % of Dow DER 664 epoxy, 14 weight % of Resimine 797 crosslinker, 3 weight % silane A-187 adhesion promoter and minor amounts of silicon lubricant and matting agents dissolved in approximately 58 weight % of a combination of methyl ethyl ketone, N-propanol and toluene solvent composition. To this mixture is added 8 weight % of Nacure 155 curing agent. The composition is applied to the front surface of a flexible polyester film and is subsequently cured by heating.

A heat activated adhesive coating is prepared containing 1.3 weight % of Alcoa S11, 10.5 weight % of Adcote 35K2 and 63 weight % of Adcote2730-2B dissolved in a mixture of ethanol and toluene as the balance. The adhesive composition is then applied to the opposite surface of the polyester film and dried. The final product has a write-erasable surface easily markable with dry erasable marking pens and removable using a conventional dry eraser, cloth, or paper tissue.

EXAMPLE 2

The article of Example 1 is laminated via the adhesive coating to a paperboard support. The resulting product is useful as a write-erase board.

EXAMPLE 3

The article of Example 1 is laminated via the adhesive coating to a high impact polystyrene support. The resulting product is useful as a write-erase board.

EXAMPLE 4

The article of Example 1 is laminated via the adhesive coating to a foamboard support. The resulting product is useful as a write-erase board.

While the present invention has been particularly shown and described with reference to preferred embodiments, it will be readily appreciated by those of ordinary skill in the art that various changes and modifications may be made without departing from the spirit and scope of the invention. It is intended that the claims be to interpreted to cover the disclosed embodiment, those alternatives which have been discussed above and all equivalents thereto.

What is claimed is:

1. A write-erasable article which comprises a substrate having front and rear surfaces, a substantially non-tacky, non-porous, cured epoxy coating composition on the front surface of the substrate and an adhesive coating on the rear surface of the substrate, wherein said epoxy coating composition comprises the reaction product of at least one epoxy polymer or epoxy precursor, at least one amine crosslinker, and at least one acid catalyst.

2. The article of claim 1 further comprising a support attached to the rear surface of the substrate via the adhesive coating.

3. The article of claim 2 wherein the support comprises a substantially rigid board.

4. The article of claim 2 wherein the support comprises a substantially rigid board which comprises a material selected from the group consisting of polymers, cardboard, foamboard, wood, glass, metals, paper, and masonry board, and has a thickness of from about 2 mm to about 500 mm.

5. The article of claim 1 wherein the substrate comprises a polymeric film.

6. The article of claim 1 wherein the substrate comprises a polymeric film having one or more layers which are independently selected from the group consisting of homopolymers and copolymers of polyesters, polyolefins, polycarbonates, polyurethanes, halopolymers, acrylics, styrene containing polymers, polyamides, vinyl polymers and combinations thereof.

7. The article of claim 1 wherein the substrate comprises a material selected from the group consisting of poly (chlorotrifluoro ethylene) homopolymers and copolymers, ethylene chlorotrifluoroethylene copolymer, ethylene tetrafluoroethylene copolymer, fluorinated ethylene-propylene copolymers, perfluoroalkoxy polymer, poly(vinylidene fluoride), poly(vinyl fluoride), poly(vinylidene chloride), poly(vinyl chloride), homopolymers and copolymers of tetrafluoroethylene, homopolymers and copolymers of hexafluoropropylene, homopolymers and copolymers of vinylidene fluoride and combinations thereof.

8. The article of claim 1 wherein the substrate comprises a material selected from the group consisting of poly (chlorotrifluoro ethylene) homopolymers and copolymers, ethylene chlorotrifluoroethylene copolymer, and ethylene tetrafluoroethylene copolymer.

9. The article of claim 1 wherein the epoxy polymer or epoxy precursor has the formula:

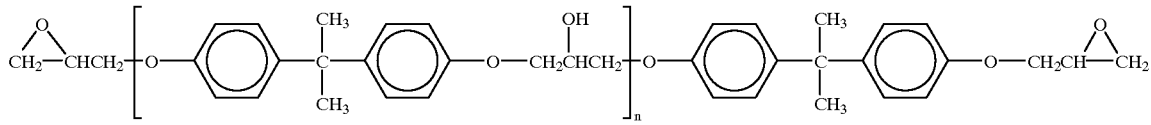

wherein n is at least 2, and an epoxide equivalent weight of at least about 500.

10. The article of claim 1 wherein the amine crosslinker comprises a melamine containing compound.

11. The article of claim 1 wherein the acid catalyst comprises at least one strong organic acid or strong mineral acid.

12. The article of claim 1 wherein the acid catalyst comprises sulfuric acid, hydrochloric acid, phosphoric acid, sulfonic acid, phosphonic acid, or mixtures thereof.

13. The article of claim 1 wherein the cured epoxy coating composition comprises one or more components selected from the group consisting of fillers, surfactants, adhesion promoters, lubricants, matting agents, colorants, slip additives, nucleating agents, plasticizers, reinforcing agents, antiblocking agents, oxidation stabilizers, oxidation inhibitors, thermal stabilizers and ultraviolet light stabilizers.

14. The article of claim 1 wherein the adhesive coating comprises a pressure sensitive adhesive.

15. The article of claim 1 wherein the adhesive coating comprises a heat activatable adhesive.

16. A writable-erasable board which comprises a substrate having front and rear surfaces, a substantially non-tacky, non-porous, cured epoxy coating composition on the front surface of the substrate, an adhesive coating on the rear surface of the substrate, and a support attached to the rear surface of the substrate via the adhesive coating, wherein said epoxy coating composition comprises the reaction product of at least one epoxy polymer or epoxy precursor, at least one amine crosslinker, and at least one acid catalyst.

17. The writable-erasable board of claim 16 wherein the support comprises a substantially rigid board.

18. The writable-erasable board of claim 16 wherein the support comprises a substantially rigid board which comprises a material selected from the group consisting of polymers, cardboard, wood, glass, metals, paper, and masonry board, and has a thickness of from about 2 mm to about 500 mm.

19. The writable-erasable board of claim 16 wherein the substrate comprises a polymeric film.

20. The writable-erasable board of claim 16 wherein the substrate comprises a flexible polymeric film having one or more layers which are independently selected from the group consisting of homopolymers and copolymers of polyesters, polyolefins, polycarbonates, polyurethanes, halopolymers, acrylics, styrene containing polymers, polyamides, vinyl polymers and combinations thereof.

21. The writable-erasable board of claim 16 wherein the substrate comprises a material selected from the group consisting of poly(chlorotrifluoro ethylene) homopolymers and copolymers, ethylene chlorotrifluoroethylene copolymer, ethylene tetrafluoroethylene copolymer, fluorinated ethylene-propylene copolymers, perfluoroalkoxy polymer, poly(vinylidene fluoride), poly(vinyl fluoride), poly(vinylidene chloride), poly(vinyl chloride), homopolymers and copolymers of tetrafluoroethylene, homopolymers and copolymers of hexafluoropropylene, homopolymers and copolymers of vinylidene fluoride and mixtures thereof.

22. The writable-erasable board of claim 16 wherein the epoxy polymer or epoxy precursor has the formula:

25. The writable-erasable board of claim 16 wherein the acid catalyst comprises sulfuric acid, hydrochloric acid, phosphoric acid, sulfonic acid, phosphonic acid or mixtures thereof.

26. The writable-erasable board of claim 16 wherein the cured epoxy coating composition comprises one or more components selected from the group consisting of fillers, surfactants, adhesion promoters, lubricants, matting agents, colorants, slip additives, nucleating agents, plasticizers, reinforcing agents, antiblocking agents, oxidation stabilizers, oxidation inhibitors, thermal stabilizers and ultraviolet light stabilizers.

27. The writable-erasable board of claim 16 wherein the adhesive coating comprises a heat activatable adhesive or a pressure sensitive adhesive.

28. A method of producing a writable-erasable board which comprises forming a substantially non-tacky, non-porous, cured epoxy coating composition on the front surface of a substrate; forming an adhesive coating on the rear surface of the substrate; and then attaching a support to the rear surface of the substrate via the adhesive coating, wherein said epoxy coating composition comprises the reaction product of at least one epoxy polymer or epoxy precursor, at least one amine crosslinker, and at least one acid catalyst.

29. The method of claim 28 wherein the support comprises a substantially rigid board.

30. The method of claim 28 wherein the support comprises a substantially rigid board which comprises a material selected from the group consisting of polymers, cardboard, wood, glass, metals, paper, and masonry board, and has a thickness of from about 2 mm to about 500 mm.

31. The method of claim 28 wherein the substrate comprises a polymeric film.

32. The method of claim 28 wherein the substrate comprises a flexible polymeric film having one or more layers which are independently selected from the group consisting of homopolymers and copolymers of polyesters, polyolefins, polycarbonates, polyurethanes, halopolymers, acrylics, styrene containing polymers, polyamides, vinyl polymers and combinations thereof.

33. The method of claim 28 wherein the substrate comprises a material selected from the group consisting of

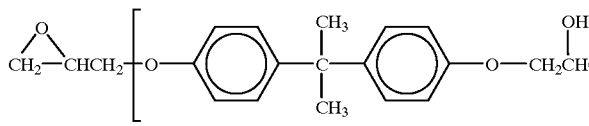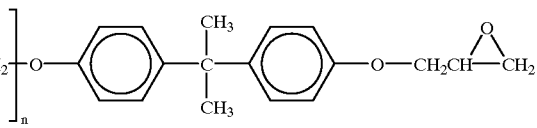

wherein n is at least 2, and an epoxide equivalent weight of at least about 500.

23. The writable-erasable board of claim 16 wherein the amine crosslinker comprises a melamine containing compound.

24. The writable-erasable board of claim 16 wherein the acid catalyst comprises at least one strong organic acid or strong mineral acid.

poly(chlorotrifluoro ethylene) homopolymers and copolymers, ethylene chlorotrifluoroethylene copolymer, ethylene tetrafluoroethylene copolymer, fluorinated ethylene-propylene copolymers, perfluoroalkoxy polymer, poly(vinylidene fluoride), poly(vinyl fluoride), poly(vinylidene chloride), poly(vinyl chloride), homopolymers and copolymers of tetrafluoroethylene, homopolymers and copolymers of hexafluoropropylene, homopolymers and copolymers of vinylidene fluoride and mixtures thereof.

34. The writable-erasable board of claim 28 wherein the epoxy polymer or epoxy precursor has the formula

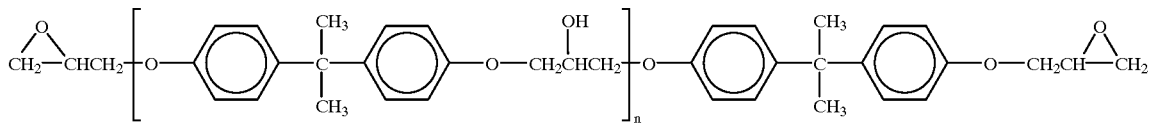

wherein n is at least 2, and an epoxide equivalent weight of at least about 500.

35. The writable-erasable board of claim 28 wherein the amine crosslinker comprises a melamine containing compound.

36. The writable-erasable board of claim 28 wherein the acid catalyst comprises at least one strong organic acid or strong mineral acid.

37. The writable-erasable board of claim 28 wherein the acid catalyst comprises sulfuric acid, hydrochloric acid, phosphoric acid, sulfonic acid, phosphonic acid or mixtures thereof.

38. The method of claim 28 wherein the cured epoxy coating composition comprises one or more components selected from the group consisting of adhesion promoters, lubricants, matting agents, colorants, slip additives, fillers, nucleating agents, plasticizers, reinforcing agents, antiblocking agents, oxidation stabilizers, oxidation inhibitors, thermal stabilizers and ultraviolet light stabilizers.

39. The method of claim 28 wherein the adhesive coating comprises a heat activatable adhesive or a pressure sensitive adhesive.

* * * * *